Oct. 25, 1960 F. B. WOOD 2,957,315

APPARATUS FOR PRINTING ON HEAT SENSITIVE MEDIA

Filed June 25, 1958

INVENTOR.
FREDERICK B. WOOD

BY Walter L. Madden, Jr.

ATTORNEY 2,957,315
Patented Oct. 25, 1960

2,957,315

APPARATUS FOR PRINTING ON HEAT SENSITIVE MEDIA

Frederick B. Wood, San Jose, Calif., assignor to International Business Machines Corporation, New York, N.Y., a corporation of New York Filed June 25, 1958, Ser. No. 744,490

3 Claims. (Cl. 62—3)

Figure 1:
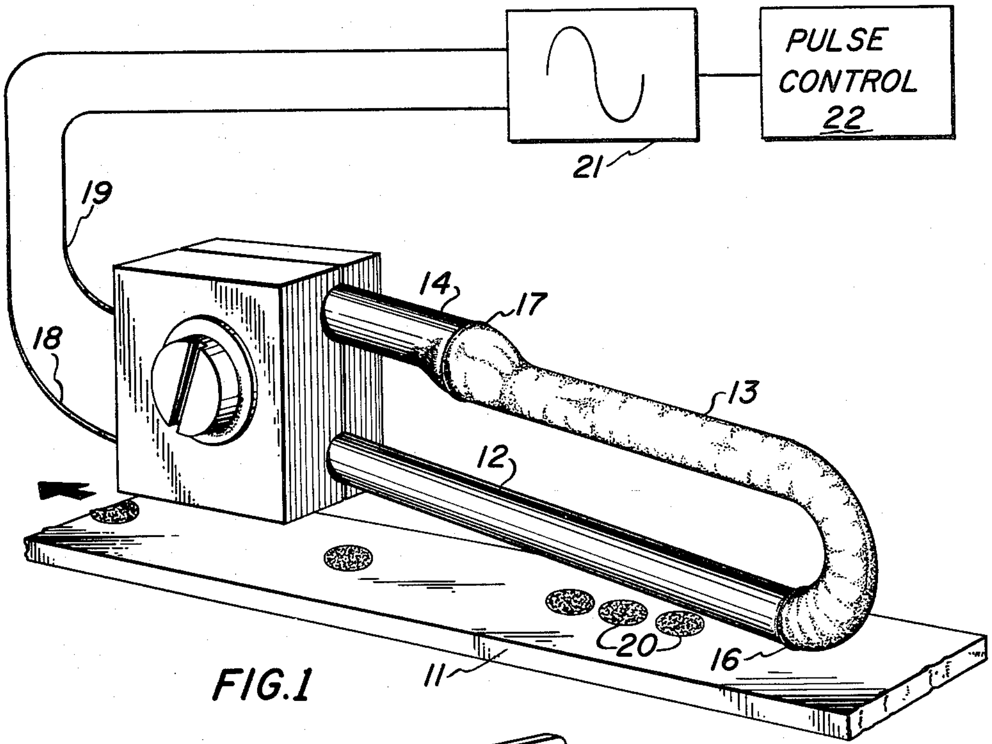

This invention relates in general to printing and relates more particularly to methods and apparatus for printing on heat sensitive media.

There are numerous applications where it is desired to perform relatively high speed printing operations on some type of heat sensitive printing medium. One of such applications, for example, arises in connection with the printing of output data from a data processing system. The use of a dry, heat sensitive paper for such output printers has many desirable features, such as the elimination of the need for any fluid developing or other processing of the paper. However, such heat sensitive papers have the disadvantage that they are relatively slow acting, thus tending to decrease the printing rate obtainable. One of the factors which tends to slow the printing rate of such heat sensitive papers is the fact that after heating of a discrete area of the heat sensitive paper for printing thereon, the heated imprinting mechanism must be either removed from the paper or cooled in some manner prior to movement of the paper, to prevent undesired blurring of areas of the paper between the characters to be printed.

Broadly, the present invention contemplates methods and apparatus for printing on heat sensitive media, in which the Peltier effect is utilized to produce a cooling of the mechanism performing the printing operation. The Peltier effect is a thermoelectric effect exhibited in circuits containing two dissimilar metals which have two junctions through which a current flows. The currrent flow produces a thermoelectric heating at one of the junctions and a thermoelectric cooling or absorption of heat at the other junction, and the thermoelectric heating and cooling is reversible upon reversing the direction of current flow. In the present invention the Peltier effect is utilized by providing a printing mechanism having portions of dissimilar thermoelectric metals or alloys connected together electrically so as to form two junctions. One of these junctions is positioned on or closely adjacent the area of the heat sensitive medium to be imprinted, and a current is supplied through the thermocouple in a predetermined direction to generate heat at this junction. This generation of heat produces the desired printing on the heat sensitive medium adjacent the junction. Upon completion of the desired heating, the current through the bi-metallic device is reversed in direction, so that thermoelectric absorption of heat now takes place at the junction adjacent the heat sensitive medium as a result of the reversal of current flow through the bi-metallic element. This cooling reduces the temperature of the junction in the area adjacent the heat sensitive medium below the temperature required to produce printing on the medium. Thus, this cooling effect permits the medium to be moved relative to the printing mechanism to position the medium for printing the next character or other indicia, without producing a blurring on the medium between separate characters. The current reversal through the bi-metallic element to produce the alternate heating and cooling of the element may be produced by any suitable means. For example, by supplying a single cycle of alternating current to the bi-metallic element, thermoelectric heating of one junction is produced during the first half cycle of the current flow, and thermoelectric cooling of this junction results upon reversal of the current flow for the second half cycle of the current pulse.

It is therefore an object of the present invention to provide improved methods and apparatus of printing on heat sensitive media.

It is a further object of the present invention to provide methods and apparatus for printing on heat sensitive media utilizing the Peltier effect to produce thermoelectric cooling of the printing mechanism.

It is an additional object of the present invention to provide methods and apparatus for printing on a heat sensitive medium in which the printing mechanism is in the form of a bi-metallic thermocouple having a junction disposed adjacent the medium to be imprinted and having current supplied through the junction first in one direction, to produce heating of the junction and printing on the medium and then in the other direction, to produce thermoelectric cooling of the heating element.

Other objects of the invention will be pointed out in the following description and claims and illustrated in the accompanying drawings which disclose, by way of example, the principle of the invention and the best mode which has been contemplated of applying that principle.

In the drawings:

Fig. 1 diagrammatically illustrates one embodiment of a heating device suitable for producing printing on a heat sensitive medium in accordance with the present invention.

Figure 2:
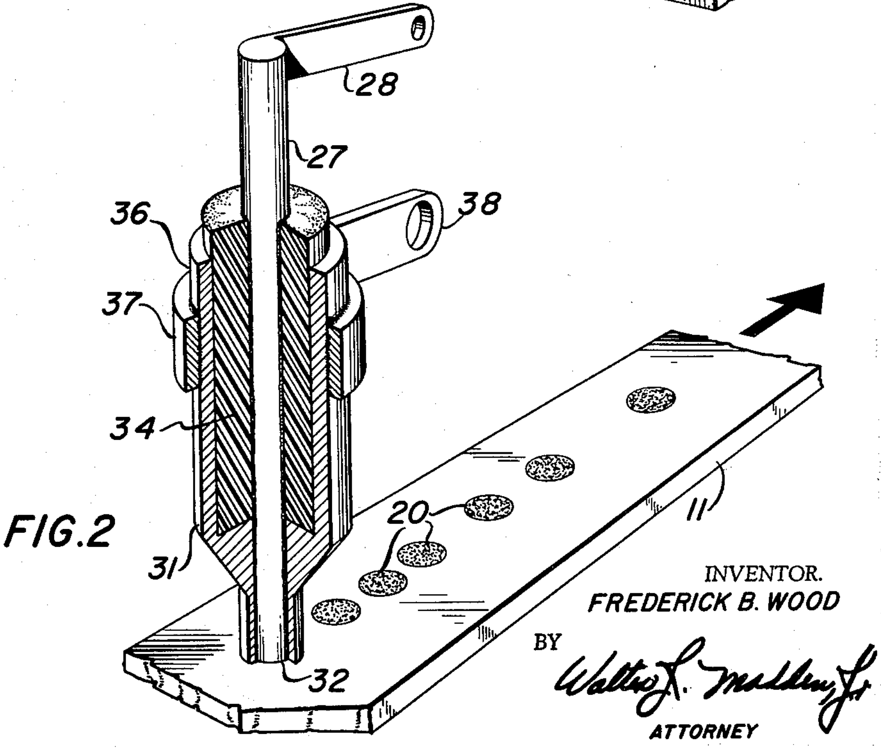

Fig. 2 diagrammatically illustrates another embodiment of a heating device for carrying out the present invention.

Referring to Fig. 1 by character of reference, numeral 11 designates generally a heat sensitive medium on which it is desired to produce printed information. Medium 11 may for example be a sheet of heat sensitive paper sold under the trademark "Thermofax." Medium 11 responds to the application of heat thereto by darkening or discoloring in the area of heat application to produce a printed indication having the general configuration of the heated printing mechanism. In the embodiment illustrated in Fig. 1, the heating element is in the form of a thermocouple probe having a pair of metallic substances having thermoelectric properties. The probe has a first portion 12 of one metal or alloy, a second portion 13 of a metal or alloy dissimilar to portion 12, and a third portion 14 of a metal or alloy similar to that of portion 12. Portions 12 and 13 are electrically joined together by any suitable means such as fusing at a first junction 16 which is positioned on or closely adjacent the area to be imprinted on material 11. Similarly, portion 13 and portion 14 are electrically joined at a second junction 17. The non-junctioned ends of portions 12 and 14 are electrically connected by conductors 18 and 19 to a source of current having the desired wave shape. Such source may be, for example, an impulse transformer 21 which is operative when pulsed to produce an output in the form of a single cycle pulse. Pulse output device 21 may be under the control of a mechanism 22, which controls the pulsing of network 21 and the consequent printing on medium 11.

In operation, with junction 16 disposed on or closely adjacent heat sensitive medium 11, and with medium 11 moving past the junction at some suitable rate, impulse transformer 21 may be pulsed by network 22 to supply a single cycle pulse of current through conductors 18 and 19 to the heating element. During the positive half cycle of this current pulse, the current flow through the bi-metallic element and junction 16 is in a direction to produce thermoelectric heating at junction 16 and to produce thermoelectric absorption of heat or cooling at junction 17. The total heating in the vicinity of junction 16 will be a function of both the resistive or $I^2R$ heating and the thermoelectric heating of junction 16. The total heat generated in the vicinity of junction 16 heats the adjacent heat sensitive medium 11 to produce the desired printing on medium 11. Such printing may be of any suitable configuration corresponding to the general configuration of the area of junction 16 exposed to medium 11. For example, the printing may be in the form of dots 20 which, together with dots simultaneously or sequentially formed by other heating elements similar to that illustrated, form the character to be printed.

At the end of the positive half cycle of the current pulse from transformer 21, the direction of current flow through junction 16 reverses to produce a thermoelectric absorption of heat or cooling at junction 16 and a thermoelectric heating at junction 17, in accordance with the Peltier effect. There will, of course, still be a heating in the vicinity of junction 16 from the $I^2R$ effect, even though the direction of the current flow through the thermocouple is reversed. The thermoelectric cooling of junction 16 acts in opposition to the $I^2R$ heating to cool the portion of the heating element adjacent medium 11. The thermoelectric cooling at junction 16 is of sufficient magnitude so that the temperature of the element in this area is reduced below that required to produce heating or printing on medium 11. Since the temperature of the heating element is below that required to produce printing on medium 11, medium 11 may be moved relative to the heating element to position the medium for the next printing operation, without producing a blurring or undesired printing on the medium in the area between the desired printing areas and without requiring that the printing probe be lifted from medium 11.

Any suitable pairs of metals may be utilized in constructing the thermocouple heating element illustrated in the drawing. Example of pairs of metals which exhibit the Peltier effect when connected together in a manner similar to that illustrated in the drawing are bismuth-copper, selenium-bismuth, silicon-copper, and tellurium-copper. Additionally, recent experimental work in semiconductors indicates several pairs of semiconductors which have high thermoelectric powers and which have sufficiently low resistivity to be of interest in the utilization of the present invention. Examples of these pairs of semiconductors are junctions using p-type $Bi_2Te_3$ with Bi, and p-type $Bi_2Te_3$ with n-type $Bi_2Te_3$.

The amount of cooling produced by the thermoelectric absorption of heat at the junction will depend primarily upon the characteristics of the metals utilized in making the thermocouple. Thus, the cooling will vary for different pairs of metals, so that no absolute standards can be set up, but the following general considerations will be of interest in determining the general suitability of different pairs of metals.

The total heat given off by a thermocouple junction and the adjacent metal is:

$$H(\text{watt-sec.}) = (I_2Rt \pm \pi It) \quad (1)$$

where $R$ is the resistance in ohms
$I$ is the current in amperes
$t$ is the time in seconds
$\pi$ (volts) is the Peltier coefficient for the two metals involved An examination of Equation 1 shows that the second term thereof must predominate for the Peltier effect to be significant; that is, $$\pi It > I^2Rt$$

or $$\pi > IR$$

This is necessitated by the requirement that the cooling produced by the thermoelectric absorption of heat exceed the heating resulting from the $I^2R$ effect in the vicinity of the junction in order to produce an appreciable cooling. Thus, the preferred pairs of metals used in the present invention are those which have a relatively low resistivity, to limit $I^2R$ heating, and a relatively high thermoelectric power so that the thermoelectric cooling produced by the Peltier effect upon reversal of the current through the junction will be significant in producing the desired cooling of the printing mechanism.

An additional consideration in selecting metals for use in the present invention is that the resistance of the thermocouple should not vary appreciably during use. Accordingly, the usefulness of the thermocouple pair of Se—Bi, whose resistance varies with light, appears limited from a practical standpoint.

Fig. 2 illustrates an alternative embodiment of the present invention which provides a larger cross-sectional area at the second junction of the thermocouple. In Fig. 2 numeral 27 designates a generally cylindrical member of a suitable material such as copper. Member 27 is provided on one end thereof with a lug portion 28 for making an electrical connection thereto. Member 27 has joined thereto at its lower end a member 31 to form a first junction 32. Member 31 may be any material, such as bismuth, which is suitable for use in a thermocouple with the material of member 27. The lower end of member 27 is preferably flush with the lower end of member 31, so that junction 32 is in contact with any material underlying these lower ends. The upper portion of member 31 is spaced from member 27 by a suitable electrically insulating material 34. The second junction 36 of the device is formed between the outer surface of member 31 and a ring member 37 which surrounds member 31 and which is of the same metal as member 27. Member 37 may be provided with a lug 38 for making an electrical connection.

In operation, the embodiment of Fig. 2 operates in a manner similar to that described above for the embodiment of Fig. 1 to produce heating at junction 32 in response to current flow in one direction through the thermocouple and then to produce thermoelectric cooling at this junction in response to a reversal in direction of the current flow. It will be noted that the junction 36 is located an appreciable distance from junction 32 so that the thermoelectric and $I^2R$ heating in the vicinity of junction 36 does not reduce the thermoelectric cooling produced at junction 32. Further, junction 36 has a relatively large cross-sectional area so that the current density through the junction is low, thus reducing the $I^2R$ heating of this junction.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for alternately heating and cooling a specific area of a medium within a relatively short time comprising a probe having a first and a second thermoelectric junction, said first junction being disposed in heat-conducting relation to said area to be heated and said second junction being disposed away from said first junction, and means for supplying an alternating electric current pulse serially to said junctions to produce thermoelectric heating at said first junction during the first half cycle of said pulse and to produce thermoelectric cooling at said first junction during the second half cycle of said pulse, said pulse having a period approximately equal to said time within which said alternate heating and cooling occur.

2. Apparatus in accordance with claim 1 in which said first junction has a different cross sectional area than said second junction.

3. Apparatus in accordance with claim 1 in which said junctions are formed of dissimilar metal members concentrically disposed with respect to each other.

References Cited in the file of this patent

UNITED STATES PATENTS

| | | |
|---|---|---|
| 413,136 | Dewey | Oct. 15, 1889 |
| 1,351,071 | Silverman et al. | Aug. 31, 1920 |
| 1,770,493 | Ranger | July 15, 1930 |
| 1,804,072 | Turrettini | May 5, 1931 |
| 2,352,056 | Wilson | June 20, 1944 |
| 2,844,638 | Lindeblad | July 22, 1958 |

FOREIGN PATENTS

| | | |
|---|---|---|
| 1,108,370 | France | Aug. 31, 1955 |